US011057934B2

(12) United States Patent
Abedini et al.

(10) Patent No.: US 11,057,934 B2
(45) Date of Patent: Jul. 6, 2021

(54) INITIAL ACCESS PROCEDURE USING PRECONFIGURED RESOURCES

(71) Applicant: QUALCOMM Incorporated, San Diego, CA (US)

(72) Inventors: Navid Abedini, Raritan, NJ (US); Tao Luo, San Diego, CA (US); Sundar Subramanian, Bridgewater, NJ (US); Muhammad Nazmul Islam, Edison, NJ (US); Junyi Li, Chester, NJ (US); Ashwin Sampath, Skillman, NJ (US); Juergen Cezanne, Ocean Township, NJ (US); Bilal Sadiq, Basking Ridge, NJ (US); Krishna Kiran Mukkavilli, San Diego, CA (US); Durga Prasad Malladi, San Diego, CA (US); Ozge Koymen, Princeton, NJ (US); Atul Maharshi, South Orange, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/409,496

(22) Filed: Jan. 18, 2017

(65) Prior Publication Data

US 2018/0063868 A1 Mar. 1, 2018

Related U.S. Application Data

(60) Provisional application No. 62/379,693, filed on Aug. 25, 2016.

(51) Int. Cl.
*H04W 74/08* (2009.01)
*H04B 17/24* (2015.01)
(Continued)

(52) U.S. Cl.
CPC ........ *H04W 74/0833* (2013.01); *H04B 17/24* (2015.01); *H04J 1/02* (2013.01);
(Continued)

(58) Field of Classification Search
CPC ................................................. H04W 74/0833
See application file for complete search history.

(56) References Cited

U.S. PATENT DOCUMENTS

| 2011/0075629 A1* | 3/2011 | Seo ..................... H04W 74/002 370/330 |
| 2011/0122938 A1* | 5/2011 | Kameya ................ H04L 27/263 375/228 |

(Continued)

FOREIGN PATENT DOCUMENTS

| EP | 2339890 A1 | 6/2011 |
| WO | 2010062060 A2 | 6/2010 |

(Continued)

OTHER PUBLICATIONS

International Search Report and Written Opinion—PCT/US2017/048455—ISA/EPO—dated Nov. 8, 2017.

(Continued)

*Primary Examiner* — Kodzovi Acolatse
*Assistant Examiner* — The Hy Nguyen
(74) *Attorney, Agent, or Firm* — Procopio, Cory, Hargreaves & Savitch LLP; Kevin M. Donnelly

(57) ABSTRACT

In aspects, a user equipment may be configured to determine a preconfigured frequency band that is less than an available system bandwidth. The UE may be further configured to perform an initial access procedure with a base station using the preconfigured frequency band. The initial access procedure may include a random access channel (RACH) procedure.

30 Claims, 13 Drawing Sheets

(51) Int. Cl.
*H04J 1/02* (2006.01)
*H04L 5/00* (2006.01)
*H04L 12/26* (2006.01)
*H04W 72/04* (2009.01)
*H04B 7/204* (2006.01)

(52) U.S. Cl.
CPC ........ *H04L 5/0048* (2013.01); *H04L 43/0894* (2013.01); *H04W 72/042* (2013.01); *H04W 72/0453* (2013.01); *H04B 7/2041* (2013.01)

(56) References Cited

U.S. PATENT DOCUMENTS

| | | | | |
|---|---|---|---|---|
| 2013/0083749 | A1* | 4/2013 | Xu | H04W 74/0833 370/329 |
| 2014/0198742 | A1 | 7/2014 | Baldemair et al. | |
| 2016/0119910 | A1* | 4/2016 | Krzymien | H04B 7/0639 370/329 |
| 2017/0150387 | A1* | 5/2017 | Fujishiro | H04W 16/14 |
| 2018/0115990 | A1* | 4/2018 | Abedini | H04W 76/10 |
| 2018/0234212 | A1* | 8/2018 | Park | H04L 1/1812 |
| 2018/0359790 | A1* | 12/2018 | Ingale | H04W 28/16 |
| 2019/0029040 | A1* | 1/2019 | Sun | H04W 74/085 |
| 2019/0207636 | A1* | 7/2019 | Luo | H01Q 3/36 |
| 2019/0254026 | A1* | 8/2019 | Liu | H04B 7/0695 |
| 2019/0306888 | A1* | 10/2019 | Takeda | H04W 72/046 |

FOREIGN PATENT DOCUMENTS

| | | |
|---|---|---|
| WO | 2013049520 A1 | 4/2013 |
| WO | 2014189286 A1 | 11/2014 |

OTHER PUBLICATIONS

ZTE: "NR Random Access Procedure", 3GPP Draft; R2-165110, 3rd Generation Partnership Project(3GPP), Mobile Competence Centre; 650, Route Des Lucioles; F-06921, Sophia-Antipolis Cedex; France, vol. RAN WG2, No. Gothenburg, Sweden; Aug. 21, 2016, XP051126733, Retrieved from the Internet: URL:http://www.3gpp.org/ftp/Meetings_3GPP_SYNC/RAN2/Docs/ [retrieved on Aug. 21, 2016], 7 pages.

* cited by examiner

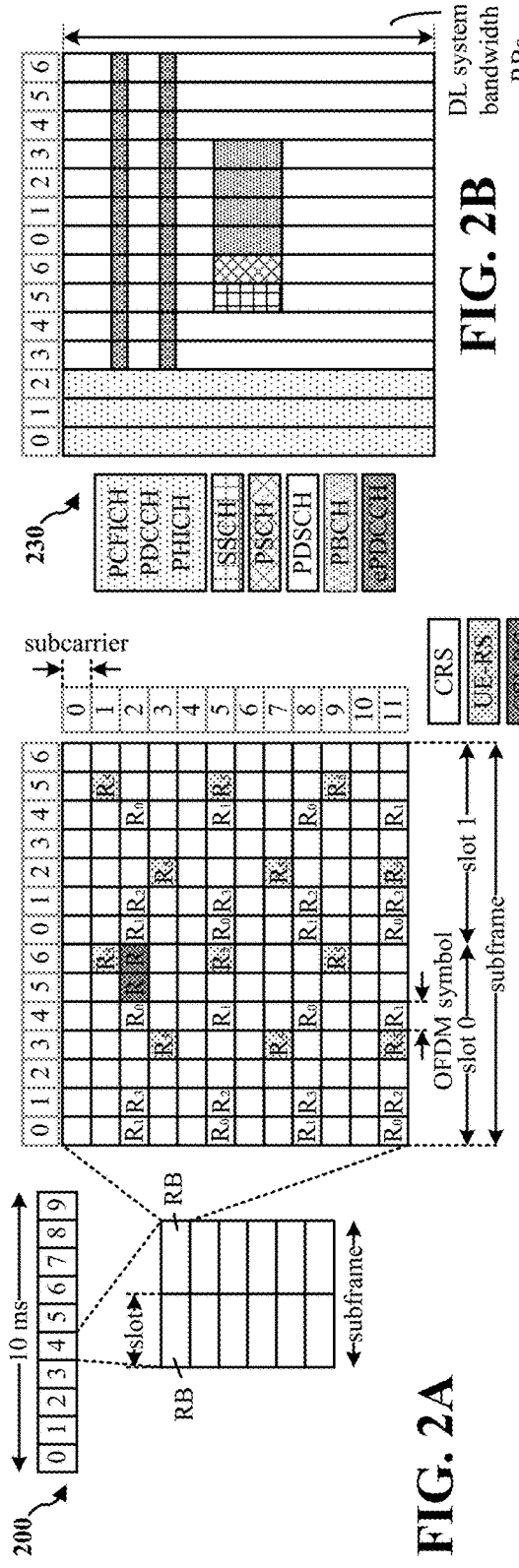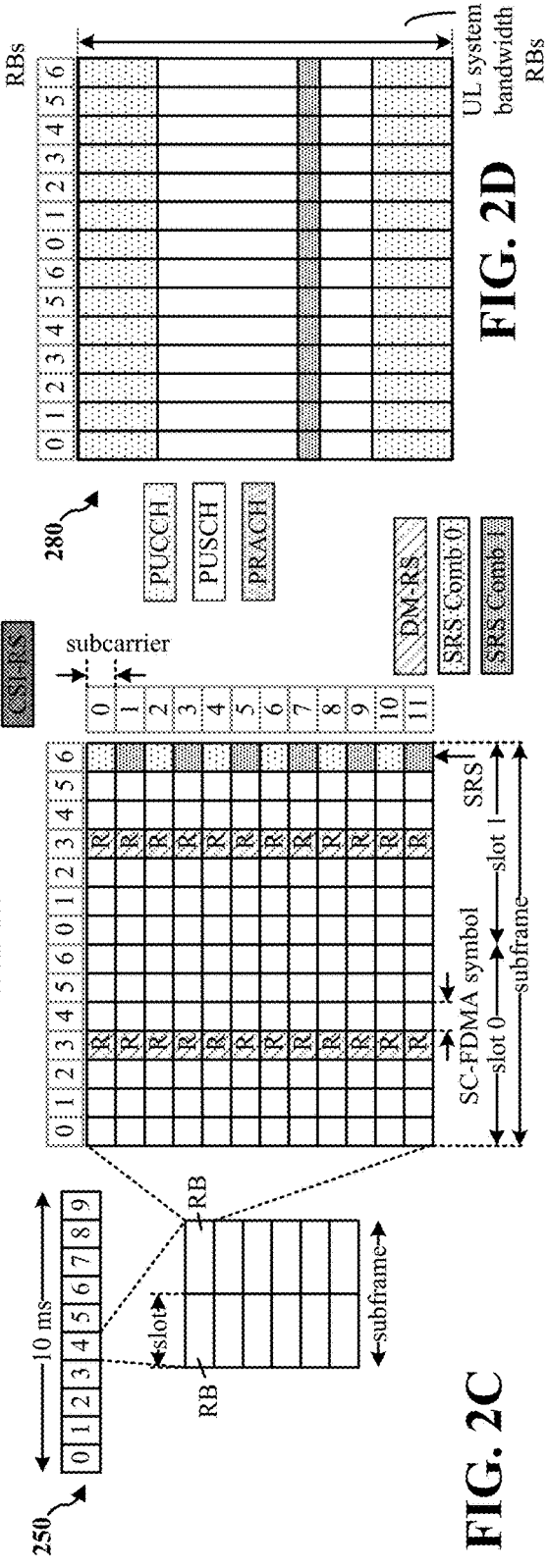

INITIAL ACCESS PROCEDURE USING PRECONFIGURED RESOURCES

CROSS-REFERENCE TO RELATED APPLICATION

This application claims the benefit of U.S. Provisional Application Ser. No. 62/379,693, entitled "Initial Access Procedure Using Preconfigured Resources" and filed on Aug. 25, 2016, which is expressly incorporated by reference herein in its entirety.

BACKGROUND

Field

The present disclosure relates generally to communication systems, and more particularly, to a user equipment configured to perform an initial access procedure with a base station using preconfigured resources.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. In aspects, a first apparatus may be configured to determine a preconfigured frequency band that is less than an available system bandwidth. The first apparatus may be further configured to perform an initial access procedure with a base station using the preconfigured frequency band. The initial access procedure may include a random access channel (RACH) procedure.

In an aspect of the disclosure, a second method, a second computer-readable medium, and a second apparatus are provided. In aspects, a second apparatus may be configured to determine a preconfigured frequency band that is less than an available system bandwidth. The second apparatus may be further configured to perform an initial access procedure with a user equipment using the preconfigured frequency band. The initial access procedure may include a random access channel (RACH) procedure.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating LTE examples of a DL frame structure, DL channels within the DL frame structure, an UL frame structure, and UL channels within the UL frame structure, respectively.

DETAILED DESCRIPTION

Figure 1:
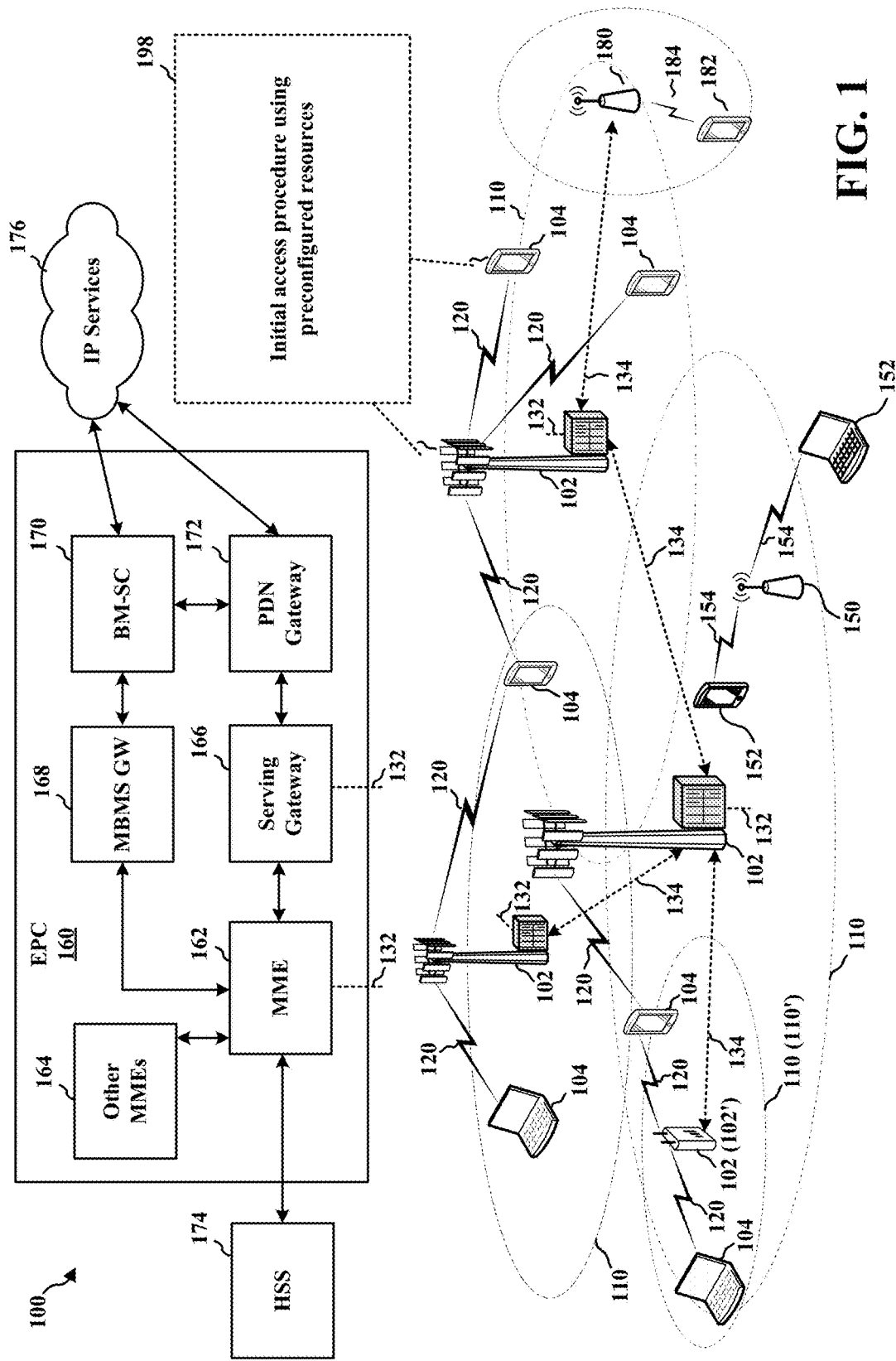
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The wireless communications system and an access network 100 may include a millimeter wave (mmW) base station 180. In one aspect, the mmW base station 180 may be integrated with a base station. The mmW base station 180 may operate in mmW frequencies and/or near mmW frequencies in communication with the UE 182. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 182 to compensate for the extremely high path loss and short range.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to perform an initial access procedure 198 in a preconfigured frequency band. The initial access procedure may include at least one of a synchronization procedure and a random access channel (RACH) procedure. The initial access procedure may be limited to a preconfigured frequency band that is less than a system bandwidth (e.g., a minimum bandwidth in the central 40 megahertz (MHz)), while further communication between the UE 104 and the base station 102 may occur at different and/or potentially wider frequency bands.

According to aspects, the UE 104 may determine a preconfigured frequency band that is less than an available system bandwidth. The UE 104 may perform an initial access procedure 198 with the base station 102 using the preconfigured frequency band. In an aspects, the initial access procedure 198 may include a RACH procedure.

At the base station 102, the base station 102 may determine a preconfigured frequency band that is less than an available system bandwidth (e.g., the same preconfigured frequency band as that determined by the UE 104). The base station 102 may perform the initial access procedure 198 with the UE 104 using the preconfigured frequency band. The initial access procedure 198 may include a RACH procedure.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (HACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
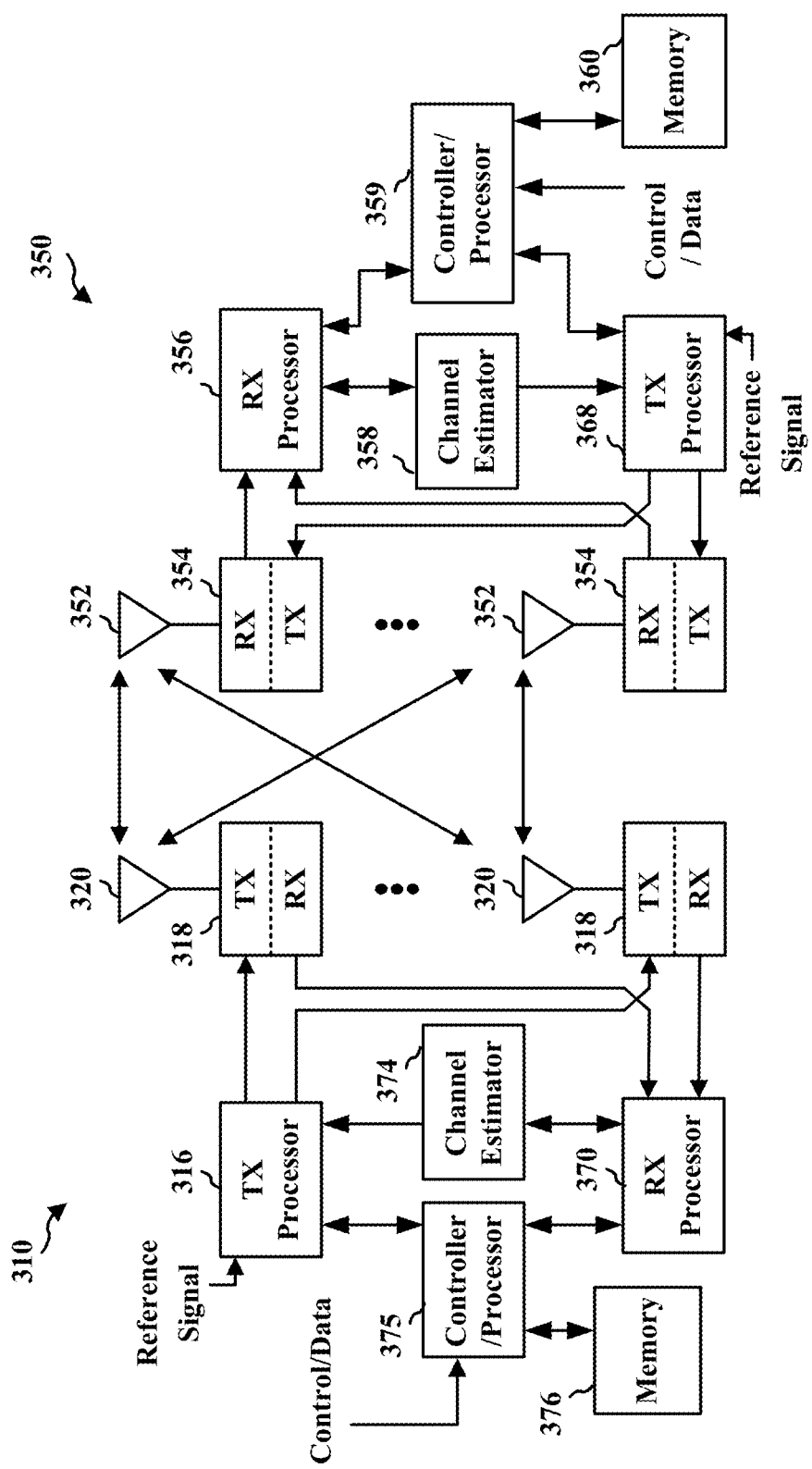
FIG. 3 is a diagram illustrating an example of a base station and user equipment (UE) in an access network.

FIG. 3 is a block diagram of a base station 310 in communication with a UE 350 in an access network. In one aspect, the base station 310 may be a base station providing a macro cell, such as an eNB. In another aspect, the base station 310 may be a mmW base station. In yet another aspect, the base station 310 may include a mmW base station that is integrated with another base station, such as a base station providing a macro cell. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
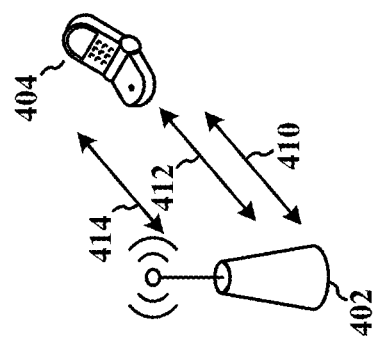
FIG. 4 is a diagram of a wireless communications system.

FIG. 4 is a wireless communications system 400. The wireless communications system 400 includes at least one UE 404 and at least one base station 402, which may be a millimeter wave (mmW) base station. According to various aspects, the UE 404 may perform, with the base station 402, an initial access procedure 410, for example, when the UE 404 is attempting to access a network in an RRC idle state. In aspects, the initial access procedure 410 may include a random access channel (RACH) procedure as well as a synchronization procedure. In aspects, the initial access procedure 410 may be limited or restricted to a specific frequency band (e.g., a minimum bandwidth in the central 40 megahertz (MHz)). However, data communication 412 between the UE 404 and the base station 402 may occur at different and/or wider bands (e.g., flexible bandwidth and/or full available system bandwidth).

In aspects, the UE 404 may determine a preconfigured frequency band that is less than an available system bandwidth. For example, the preconfigured frequency band may be a preconfigured number of MHz in a center of the available system bandwidth (e.g., the center 20 MHz or center 40 MHz). Thus, the UE 404 may know frequency resources for performing the initial access procedure 410, e.g., without receiving signaling from the base station 402. For example, a wireless system may include X frequency bands (e.g., ten frequency bands) with a total bandwidth of Y (e.g., 100 MHz). The UE 404 may use a center bandwidth of Z (e.g., the 20 MHz or 40 MHz at the center of the total system bandwidth Y). In an aspect, the UE 404 may acquire one or more of X, Y, and/or Z from the base station 402 (e.g., via one or more SIBS) and/or X, Y, and/or Z may be stored or preconfigured in the UE 404.

The UE 404 may perform, with the base station 402, an initial access procedure 410 using the preconfigured frequency band. The initial access procedure 410 may include a synchronization procedure and a RACH procedure. An aspect of the initial access procedure 410 may be described with respect to FIGS. 5 and 6.

Similarly, the base station 402 may determine the preconfigured frequency band (e.g., the base station 40 may determine the preconfigured frequency band by accessing a stored value) that is less than an available system bandwidth, which is to be used for initial access procedures by UEs (e.g., the initial access procedure 410). For example, the preconfigured frequency band may be a preconfigured number of MHz in a center of the available system bandwidth (e.g., the center 20 MHz or center 40 MHz). Thus, the base station 402 may know frequency resources for performing the initial access procedure 410, e.g., without transmitting signaling to the UE 404.

The base station 402 may perform, with the UE 404, the initial access procedure 410 using the preconfigured frequency band. The initial access procedure 410 may include a synchronization procedure and a RACH procedure.

In mmW systems, devices may need to measure and find the best transmit/receive (tx/rx) beam. Therefore, according to some aspects, the base station 402 may transmit one or more reference signals (e.g., beam reference signals (BRSs)). While the initial access procedure 410 may be limited or restricted to the preconfigured frequency band, the one or more reference signals may be transmitted on one or more bands that may be used for data communication 412. For example, the control and data part of the initial access procedure 410 may be limited to the central 40 MHz, while one or more BRSs may be transmitted in a wider bandwidth along with the control and data part of the initial access procedure 410 (e.g., using frequency-division multiplexing).

In some aspects, the UE 404 may perform one or more measurements based on the one or more BRSs. The UE 404 may then transmit, to the base station 402, feedback based on the one or more BRSs, and the feedback may include one or more measurements associated with beam quality in the one or more bands (e.g., based on measured signal quality of a BRS of a corresponding beam). Thereafter, data communication 412 may occur using bands and/or beams that are determined by the UE 404 and the base station 402 using the BRSs that are transmitted during the initial access procedure 410.

In some aspects, the UE 404 and the base station 402 may further perform a non-initial access procedure 414, which may include a non-initial RACH procedure. For example, the UE 404 may perform the non-initial access procedure 414 during RRC connection reestablishment, for beam recovery (e.g., in mmW systems), and/or for requesting resources for uplink transmission when scheduling request (SR) resource(s) is(are) not configured.

After the initial access procedure 410, the base station 402 and the UE 404 may perform data communication 412, for example, because the UE 404 is able to determine bands and/or beams for the data communication 412 during the initial access procedure 410 (e.g., based on signaling from the base station 402). In aspects, the data communication 412 may use a flexible bandwidth (e.g., the full available system bandwidth). In one aspect, the data communication 412 may use a frequency band that is wider than and encompasses the preconfigured frequency band used for the initial access procedure 410. In another aspect, the data communication 412 may use a frequency band that is at a different location than the preconfigured frequency band used for the initial access procedure 410. In another aspect, the data communication 412 may occur in one or more frequency bands of the available system bandwidth.

The non-initial access procedure 414 may use a different access procedure configuration than the configuration for the initial access procedure 410 (e.g., a different band than the preconfigured frequency band used for the initial access procedure 410). For example, the initial access procedure 410 may occur in the central 40 MHz, whereas the non-initial access procedure may occur in the rest of the available system bandwidth (e.g., in the other 60 MHz of a 100 MHz system).

The configuration for the non-initial access procedure 414 may include time and/or frequency resources (which may overlap with the preconfigured frequency band for the initial access procedure 410 and/or one or more different frequency bands). In one aspect, the non-initial access procedure 414 may use a frequency band that is wider than and encompasses the preconfigured frequency band used for the initial access procedure 410. In another aspect, the non-initial access procedure 414 may use a frequency band that is at a different location than the preconfigured frequency band that is used for the initial access procedure 410. In another aspect, the non-initial access procedure 414 may occur in multiple frequency bands of the available system bandwidth.

The configuration for the non-initial access procedure 414 may further include a RACH preamble sequence (e.g., an indication of a RACH preamble sequence). For example, the non-initial access procedure 414 may use a RACH preamble sequence from a different set of preamble sequences than the set of preamble sequences used for the initial access procedure 410.

In various aspects, the base station 402 may signal the configuration for the non-initial access procedure 414 to the UE 404 prior to the non-initial access procedure 414. For example, the base station 402 may transmit a system information block (SIB) (e.g., SIB2), and the UE 404 may determine the configuration for the non-initial access procedure 414 based on the SIB. In another example, the base station 402 may indicate the configuration for the non-initial access procedure 414 using RRC signaling, and the UE 404 may determine the configuration for the non-initial access procedure 414 based on the RRC signaling.

Figure 5:
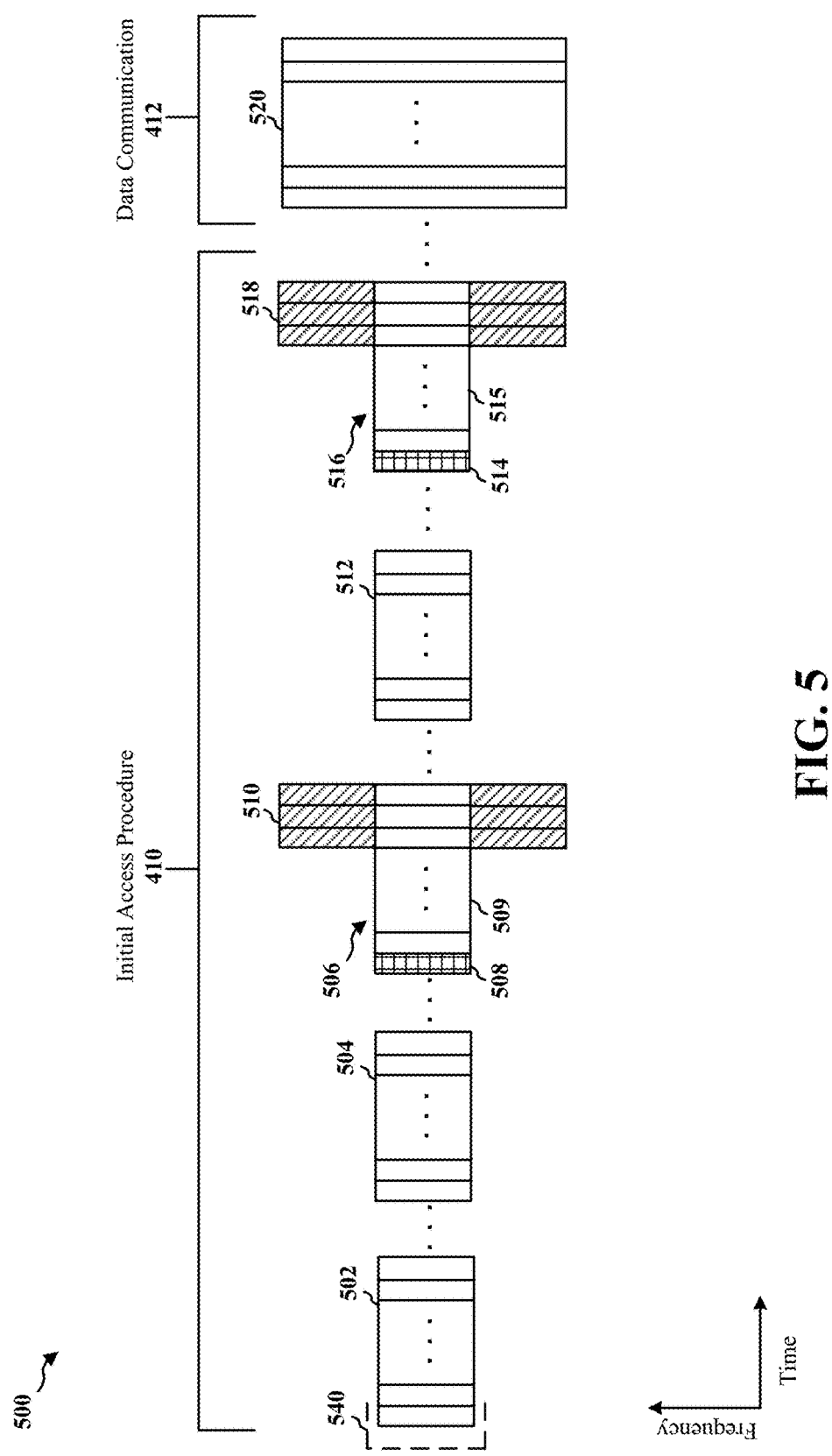
FIG. 5 is a diagram of a wireless communications system.

FIG. 5 is a diagram of a wireless communications system 500. In the wireless communications system 500, an initial access procedure 410 occurs, followed by data communication 412. During the initial access procedure 410, a synchronization procedure and a RACH procedure are limited to a preconfigured frequency band 540. For example, the preconfigured frequency band may be a number of MHz at the center of an available system bandwidth (e.g., a 20 MHz bandwidth, a 40 MHz bandwidth, etc.).

In various aspects, the UE 404 may first determine the preconfigured frequency band 540 that is less than the available system bandwidth. The UE 404 may then perform the initial access procedure 410. In an aspect of the initial access procedure 410, the UE 404 may receive downlink synchronization information 502 (e.g., a primary synchronization signal and/or a secondary synchronization signal) in the preconfigured frequency band 540.

After determining synchronization information associated with synchronizing with the base station 402 based on the downlink synchronization information 502 (e.g., by decoding PSS and SSS), the UE 404 may transmit a RACH request 504 in the preconfigured system bandwidth. The RACH request 504 may include a RACH preamble.

Based on the RACH request 504, the base station 402 may allocate resources for the UE 404. The RACH request 504 may be known as a MSG1. The base station 402 may then transmit, to the UE 404, a random access response (RAR) 506. In some aspects, the RAR 506 may be known as a MSG2. The RAR 506 may include a control signal 508 and a payload 509. The base station 402 may transmit the RAR 506 in the preconfigured frequency band 540.

In aspects, the base station 402 may further transmit, to the UE 404, one or more BRSs 510 in one or more bands that may be used for data communication. In aspects, the base station 402 may transmit the one or more BRSs 510 during the initial access procedure. For example, the base station 402 may multiplex (e.g., frequency-division multiplex) the one or more BRSs 510 with the RAR 506.

While the one or more BRSs 510 are illustrated as multiplexed with one or more symbols of the RAR 506, in another aspect, BRSs 510 may be separately transmitted and/or may not be multiplexed with any other downlink signaling. For example, the BRSs 510 may be a first set of BRSs, which are multiplexed with one or more symbols of the RAR 506, but additional BRS(s) may be further transmitted (e.g., for beam refinement, and the additional BRS(s) may be beam refinement reference signals).

The UE 404 may receive the RAR 506 in the preconfigured frequency band 540. The UE 404 may determine resources based on the RAR 506. For example, the UE 404 may determine uplink resources for a MSG3 512.

Further, the UE 404 may perform one or more measurements on the one or more BRSs 510 (e.g., the UE 404 may measure a respective received power for each BRS 510). For example, the UE 404 may determine one or more best tx/rx beam(s) from the BRSs 510. The best tx/rx beam(s) may be beams corresponding to the highest measured signal qualities (e.g., received power or received quality of the BRSs 510).

The UE 404 may transmit, to the base station 402, a MSG3 512. The MSG3 512 may be known as an RRC connection request. In some aspects, the UE 404 may transmit feedback based on the one or more measurements performed on the one or more BRSs 510 with the MSG3 512 (e.g., multiplexed with the MSG3).

In response to the MSG3 512, the base station 402 may determine contention resolution and/or a cell radio network temporary identifier (C-RNTI) for the UE 404. Based on this determination, the base station 402 may then transmit a MSG4 516 to the UE 404. The MSG4 516 may also be known as a contention resolution message. The base station 402 may transmit the MSG4 516 to the UE 404 in the preconfigured frequency band 540.

In response to the feedback from the UE 404, the base station 402 may refine one or more tx/rx beams and may transmit a second set of BRSs 518 to the UE 404 (e.g., for fine beam refinement). In aspects, the base station 402 may multiplex (e.g., frequency-division multiplex) the second set of the one or more BRSs 518 with the MSG4 516. In one aspect, the second set of BRSs 518 may be beam refinement reference signals (BRRSs).

While the second set of BRSs 518 is illustrated as multiplexed with one or more symbols of the MSG4 516, in another aspect, BRSs 518 may be separately transmitted and/or may not be multiplexed with any other downlink signaling.

According to one aspect, the base station 402 may transmit, to the UE 404, an indication of one or more resources in which the BRSs 510, 518 are to be received. The base station 402 may include such an indication in a control signal 508 of the RAR 506, in a payload 509 of the RAR 506, in a control signal 514 of the MSG4 516, in a payload 515 of the MSG4 516, in another L1 signal, or any combination thereof.

According to one aspect, the base station may further include, in a control signal 508 of the RAR 506, in a payload 509 of the RAR 506, in a control signal 514 of the MSG4 516, in a payload 515 of the MSG4 516, in another L1 signal, or any combination thereof, an indication of one or more antenna port(s) associated with one or more of the BRSs 510, 518. This indication of the one or more antenna port may be different from information associated with one or more antenna ports carried in a physical broadcast channel (PBCH).

After the initial access procedure 410, the base station 402 and the UE 404 may perform data communication. In an aspect, data communication 412 may include a downlink channel 520, such as a PDSCH. In aspects, the downlink channel 520 may use a second frequency band of the available system bandwidth. The second frequency band may be wider than and encompassing of the preconfigured frequency band 540. In another aspect, the second frequency band may be at a different location than the preconfigured frequency band 540. In another aspect, the second frequency band may be one of multiple frequency bands used for the data communication 412.

Figure 6:
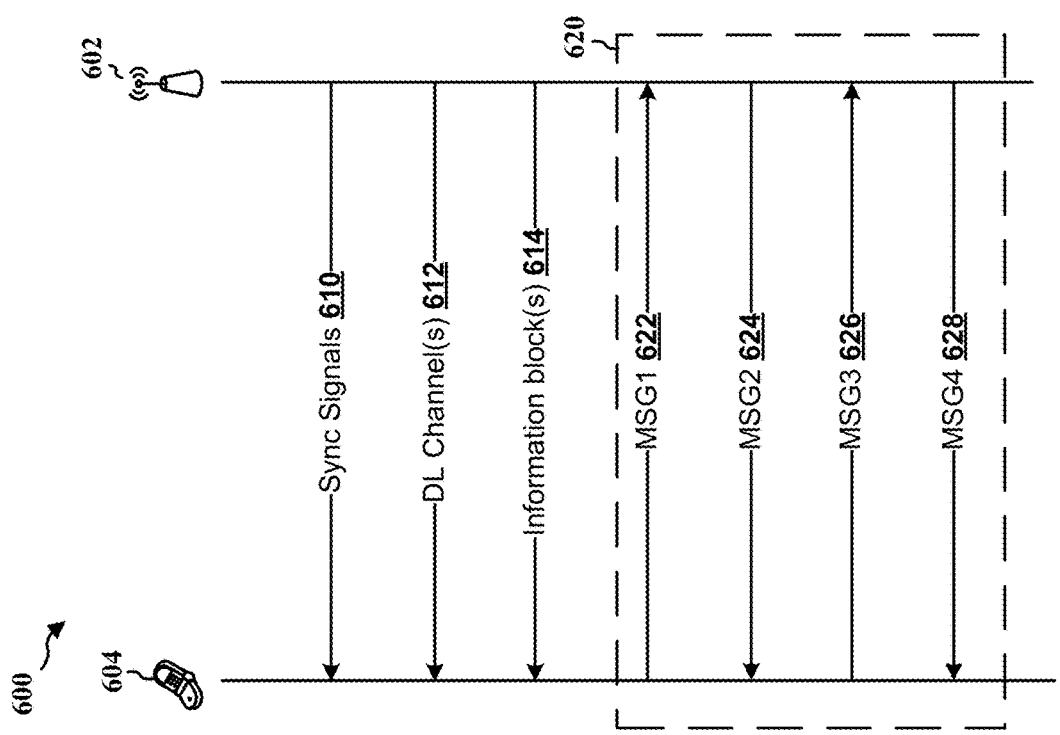
FIG. 6 is a call flow diagram of an initial access procedure.

FIG. 6 is a diagram of an initial access procedure 600. The initial access procedure 600 may be an aspect of the initial access procedure 410. According to various aspects, the initial access procedure 600 may include a synchronization procedure. The synchronization procedure may include receiving one or more synchronization signals (e.g., a PSS, a SSS, a cell-specific reference signal) 610, receiving one or more downlink (DL) channel(s) 612, and/or receiving one or more information block(s) 614. The initial access procedure 600 may further include a RACH procedure 620.

Beginning first with the synchronization procedure, the base station 602 may send one or more synchronization signal(s) 610 (e.g., PSS, SSS, cell-specific reference signal). Further, the base station 602 may send one or more DL channel(s) 612 (e.g., physical broadcast channel (PBCH), which may provide system information, including system bandwidth. The UE 604 may perform cell search and cell selection based on the synchronization signal(s) 610 and/or the DL channel(s) 612.

Additionally, the base station 602 may transmit system information, which may include one or more information block(s) 614 (e.g., MIB, SIB1, SIB2, etc.). The UE 604 may receive the one or more information block(s) 614 and determine various system information, such as downlink bandwidth, PHICH-related information, scheduling information, and/or RACH information (e.g., RACH preamble information).

The UE 604 may additionally perform a RACH procedure 620 with the base station 602 during the initial access procedure 600. First, the UE 604 may select a RACH preamble for the RACH procedure. Further, the UE 604 may determine a random access (RA) radio network temporary identity (RNTI) in order to identify the UE 604 during the RACH procedure. The UE 604 may determine an RA-RNTI based on, for example, a time slot number in which a MSG1 622 is sent. The UE 604 may include the RACH preamble and the RA-RNTI in the MSG1 622. The MSG1 622 may be an aspect of the RACH request 504.

In an aspect, the UE 604 may determine at least one resource (e.g., a time and/or frequency resource) that is to carry the MSG1 622. For example, the base station 602 may send system information (e.g., an information block(s) 614), and the UE 604 may acquire the at least one resource based on the system information (e.g., system information included in a SIB2). The UE 604 may send the MSG1 622 to the base station 602, for example, on the at least one resource. If the UE 604 does not receive a response to the MSG1 622 (e.g., after expiration of a timer), then the UE 604 may increase transmit power (e.g., by a fixed interval) and resend the MSG1 622.

Based on the MSG1 622, the base station 602 may send, to the UE 604, a MSG2 624. The MSG2 624 may be an aspect of the RAR 506. The MSG2 624 may also be known as a random access response and may be sent on a downlink shared channel (DL-SCH). The base station 602 may determine a temporary cell RNTI (T-CRNTI). Further, the base station 602 may determine a timing advance value so that the UE 604 may adjust timing to compensate for delay. The base station 602 may determine an uplink resource grant, which may include an initial resource assignment for the UE 604 so that the UE 604 may use the uplink shared channel (UL-SCH). The base station 602 may generate the MSG2 624 to include the C-RNTI, the timing advance value, and/or the uplink grant resource. The base station 602 may then transmit the MSG2 624 to the UE 604. In an aspect, the UE 604 may determine an uplink resource grant based on the MSG2 624.

Based on the MSG2 624, the UE 604 may send, to the base station 602, a MSG3 626. The MSG3 626 may be an aspect of the MSG3 512. The MSG3 626 may also be known as an RRC connection request message and/or a scheduled transmission message. The UE 604 may determine a temporary mobile subscriber identity (TMSI) associated with the UE 604 or another random value used to identify the UE 604 (e.g., if the UE 604 is connecting to the network for the first time). The UE 604 may determine a connection establishment clause, which may indicate why the UE 604 is connecting to the network. The UE 604 may generate the MSG3 626 to include at least the TMSI or other random value, as well as the connection establishment clause. The UE 604 may then transmit the MSG3 626 to the base station on the UL-SCH.

Based on the MSG3 626, the base station 602 may send, to the UE 604, a MSG4 628. The MSG4 628 may be an aspect of the MSG4 516. The MSG4 628 may also be known as a connection resolution message. The base station 602 may address the MSG4 628 toward the TMSI or random value from MSG3 626. The MSG4 628 may be scrambled with a C-RNTI associated with the UE 604. The base station 602 may transmit the MSG4 628 to the UE 604. The UE 604 may decode the MSG4 628, for example, using the C-RNTI associated with the UE 604. This RACH procedure may allow the UE 604 to be synchronized with a network. In an aspect, a non-initial access procedure (e.g., the non-initial access procedure 414) may include a RACH procedure 620. In an aspect, the non-initial access procedure may use a RACH preamble sequence from a different set of preamble sequences used for the initial access procedure.

Figure 7:
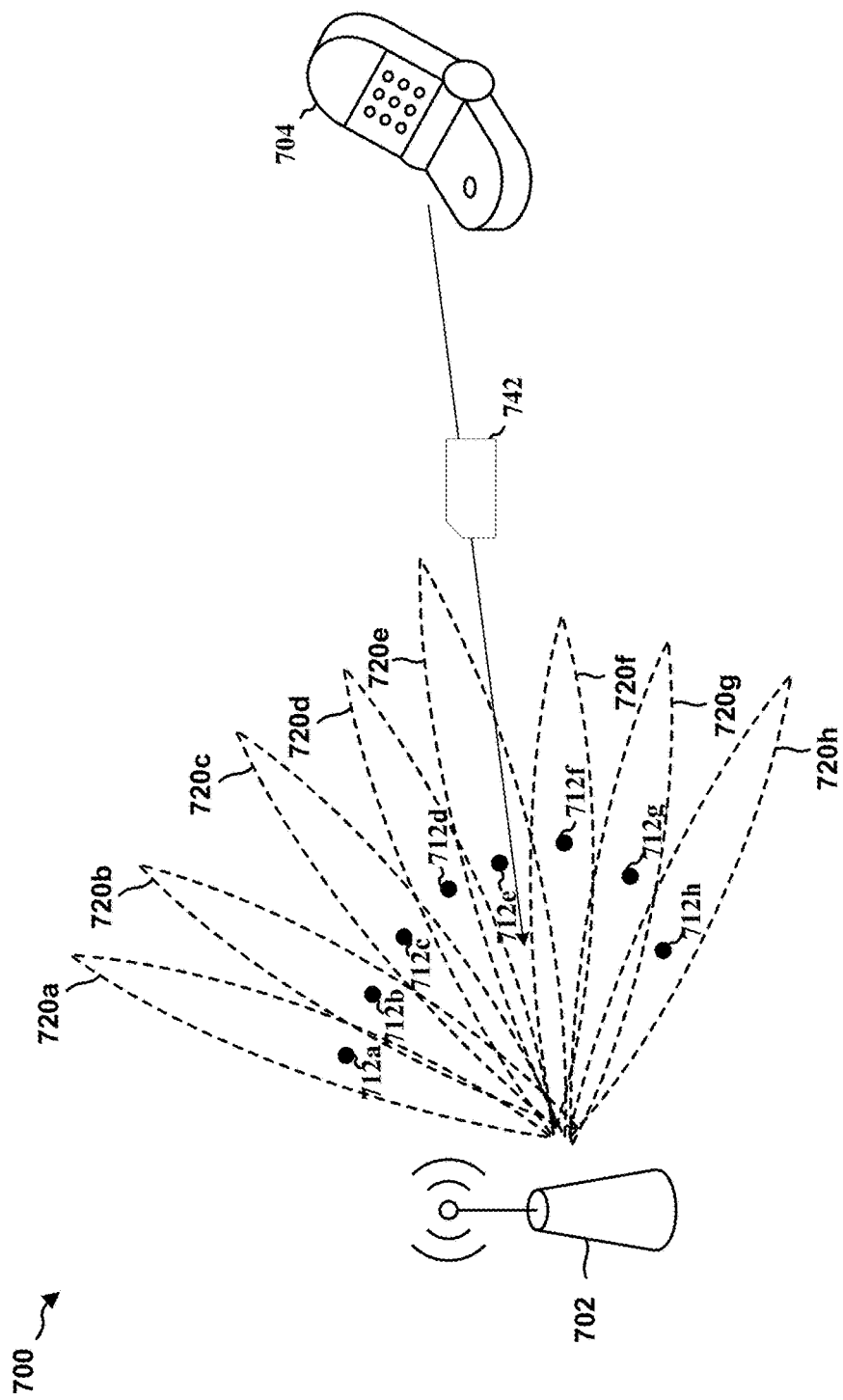
FIG. 7 is a diagram of a millimeter-wave (mmW) communication system.

FIG. 7 is a diagram of a wireless communications system 700. In the illustrated aspect, the base station 702 may include up to 8 antenna ports for BRS (BRS) transmission. In various aspects, the base station 702 may send, to the UE 704, one or more BRSs 712. Each BRS 712 may be communicated through a respective beam 720a-720h. For example, the base station 702 may send a first BRS 712a through the first beam 720a with which the first BRS 712a is associated. The UE 704 may track one or more beams 720a-720h through periodically measuring a respective BRS 712a-h associated with a respective one of the beams 720a-720h. In an aspect, the transmission period of the BRSs 712 may be configured by an indicator on a physical broadcast channel (PBCH), such as an ePBCH. The transmission period may be associated with the time to sweep the beams 720 on which the BRS 712 is transmitted.

In aspects, the UE 704 may receive, through the set of beams 720a-720h, a set of BRSs 712. Each BRS 712 may be associated with a beam index that corresponds to the particular beam 720a-720h through which the BRS 712 is sent. The UE 704 may measure a signal quality of each BRS 712, and each measured signal quality may correspond to a beam 720a-h of the set of beams 720a-720h. For example, the UE 704 may measure the signal qualities of the third BRS 712c, the fourth BRS 712d, the fifth BRS 712e, and the sixth BRS 712f, which respectively correspond to the third beam 720c, the fourth beam 720d, the fifth beam 720e, and the sixth beam 720f. In aspects, the UE 704 may not receive each of the BRSs 712a-712h.

The UE 704 may receive the one or more BRSs 712a-712h in one or more bands used for data communication. For example, each BRS 712a-712h may be received in a different band (although bands in which BRSs 712 are transmitted may overlap). In an aspect, the one or more bands in which the BRSs 712 are transmitted may be different from a preconfigured frequency used for the initial access procedure.

An initial access procedure may be limited to a preconfigured frequency band. However, in some mmW systems, BRSs 712 may be transmitted on one or more bands that may be used for performing data communication. For example, the control and data portion of an initial access procedure may be limited to the central 40 MHz around an available system bandwidth, while one or more BRSs 712 may be transmitted in a wider band, along with control information and data.

In an aspect, a first set of the one or more BRSs 712a-712h, e.g., 712a, 712b, 712c, is frequency-division multiplexed with one or more symbols sent by the base station 702 during an initial access procedure. For example, the first set of the one or more BRSs, e.g., 712a, 712b, 712c, may be frequency-division multiplexed with one or more symbols of a MSG2 (e.g., RAR 506, MSG2 624,) or a MSG4 (e.g., MSG4 516, MSG4 628).

In an aspect, the base station 702 may send, to the UE 704, an indication of one or more resources in which one or more BRSs 712 are located. For example, the base station 702 may indicate, to the UE 704, one or more resources in which one or more BRSs 712 are to be received in one or more of a control signal of a MSG2, a control signal of a MSG4, a payload of a MSG2, a payload of a MSG4, an L1 signal, or any combination thereof. In an aspect, the control signal of a MSG2, the control signal of the MSG4, the payload of a MSG2, the payload of a MSG4, the L1 signal, or any combination thereof may indicate antenna port information associated with one or more BRSs 712.

In one aspect, the UE 704 may measure the signal quality as a received power (e.g., a BRSRP). For example, the UE 704 may measure the BRSRP in decibels (dB) and/or decibel-milliwatts (dBm). In other aspects, the UE 704 may measure the signal quality as another value, such as a received quality (RQ), an signal-to-interference ratio (SIR), a signal-to-interference-plus-noise ratio (SINR), a reference signal received power (RSRP), a reference signal received quality (RSRQ), a received signal strength indicator (RSSI), or another metric. The UE 704 may transmit, to the base station 702, feedback 742 that includes or indicates the measured signal quality (e.g., the feedback 742 may include a beam index corresponding to a one of the beams 720a-h as well as a received power associated with the one of the BRSs 712a-h corresponding to the one of the beams 720a-h.

In an aspect, data communication (e.g., data communication 412) may occur through one of the beams 720. For example, the base station 702 (or the UE 704) may select a "best" beam 720a (e.g., a beam corresponding to BRS 712a with a highest measured signal quality). The base station 702 may then communicate data with the UE 704 through the selected beam, for example, using a frequency band that is wider than and/or encompassing the preconfigured frequency band, at a different location than the preconfigured frequency band, and/or one or multiple frequency bands in which one or more BRSs 712 are transmitted.

Figure 8:
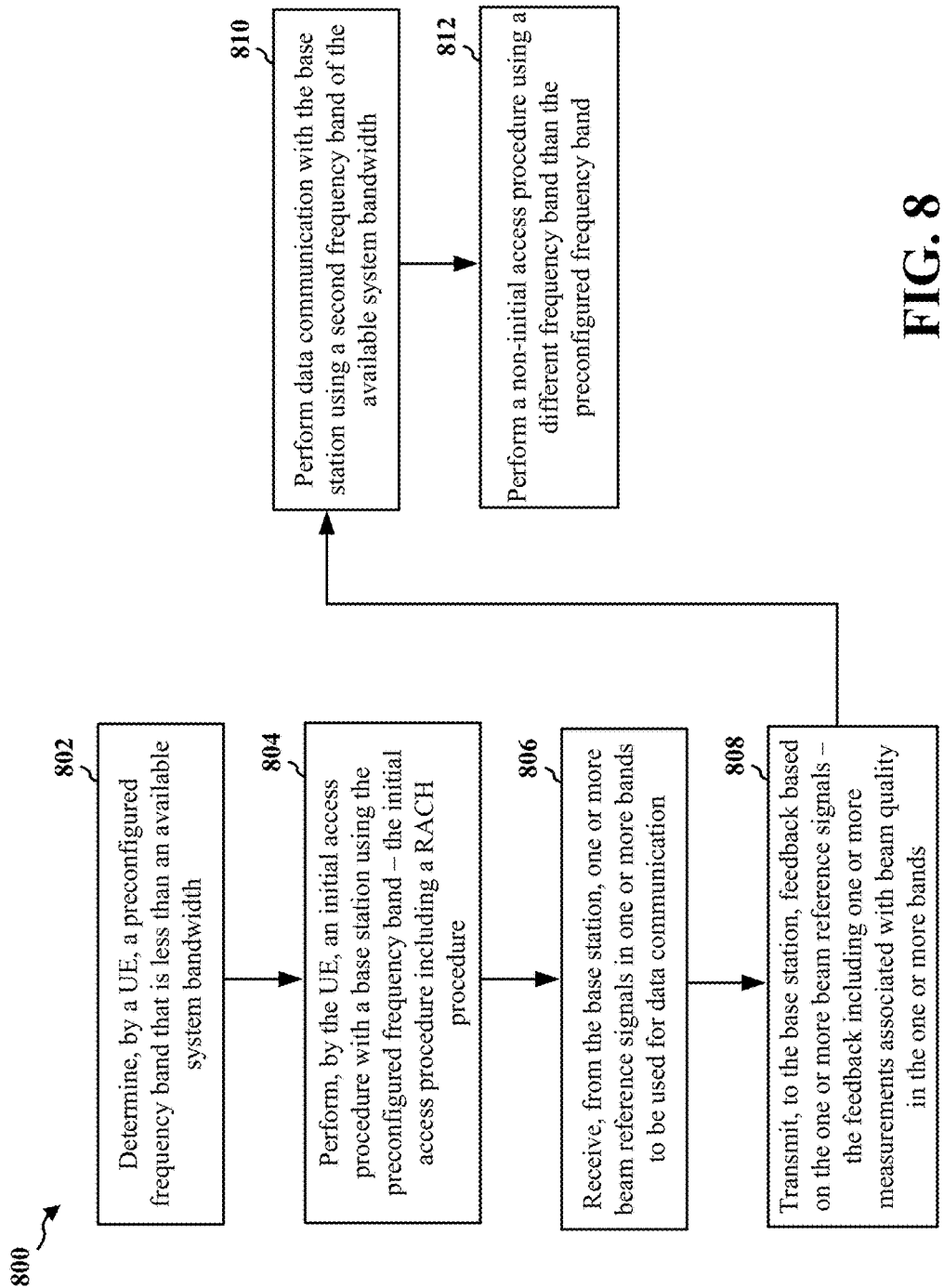
FIG. 8 is a flowchart of a method of wireless communication.

FIG. 8 is a flowchart 800 of a method of wireless communication. The method may be performed by a UE (e.g., the UE 104, the UE 404). At operation 802, the UE may determine a preconfigured frequency band that is less than an available system bandwidth. In an aspect, the preconfigured frequency band may be a stored value and/or may be defined by one or more technical specifications promulgated by 3GPP. For example, the UE 404 may determine the preconfigured frequency band 540.

At operation 804, the UE may perform an initial access procedure with a base station (e.g., a mmW base station) using the preconfigured frequency band. In aspects, the initial access procedure may include a RACH procedure. For example, the UE 404 may perform the initial access procedure 410 with the base station 402. In another aspect, the UE 604 may perform the initial access procedure 600 with the base station 602.

At operation 806, the UE may receive, from the base station, one or more BRSs in one or more bands to be used for data communication. For example, the UE 404 may receive, from the base station 402, one or more BRSs in one or more bands to be used for data communication. In some aspects, the UE 404 may receive, from the base station 402, a first set of BRSs 510, which may be frequency-division multiplexed with the RAR 506. In some aspects, the UE 404 may receive, from the base station 402, a second set of BRSs 518, which may be frequency-division multiplexed with the MSG4 516. In the context of FIG. 7, the UE 704 may receive one or more BRSs 712 that correspond to one or more beams 720, and each BRS 712 may be received in a respective frequency band that may be used for data communication.

At operation 808, the UE may transmit, to the base station, feedback based on the one or more BRSs. The feedback may include one or more measurements associated with beam quality in the one or more bands. For example, the UE 404 may perform one or more measurements on the first set of BRSs 510 and determine feedback (e.g., by measuring a respective received power for a respective received BRS) based on the one or more measurements. The UE 404 may transmit, to the base station, the feedback, which may be included with and/or multiplexed with the MSG3 512. In the context of FIG. 7, the UE 704 may transmit the feedback 742.

At operation 810, the UE may perform, after the initial access procedure, data communication with the base station using a second frequency band of the available system bandwidth. For example, referring back to FIG. 4, the UE 404 may perform, after the initial access procedure 410, data communication 412 with the base station 402.

At operation 812, the UE may perform a non-initial access procedure using a different frequency band than the preconfigured frequency band. For example, referring back to FIG. 5, the UE 404 may perform the non-initial access procedure 414 with the base station 402 using a different frequency band than the preconfigured frequency band 540.

Figure 9:
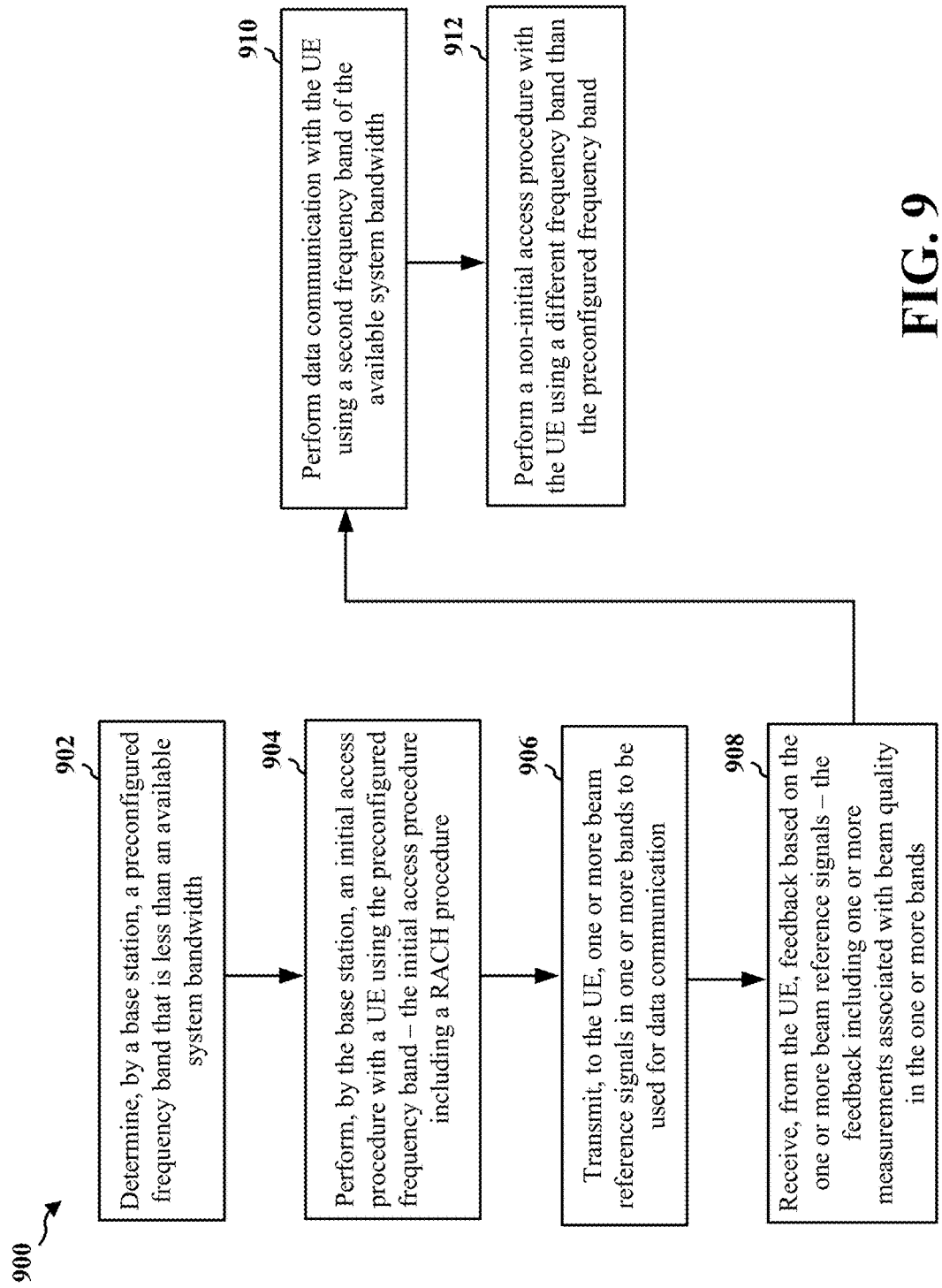
FIG. 9 is a flowchart of a method of wireless communication.

FIG. 9 is a flowchart 900 of a method of wireless communication. The method may be performed by a base station (e.g., the eNB 102, the base station 402). At operation 902, the base station may determine a preconfigured frequency band that is less than an available system bandwidth. In an aspect, the preconfigured frequency band may be a stored value and/or may be defined by one or more technical specifications promulgated by 3GPP (e.g., the base station may determine the preconfigured frequency band by accessing a stored value). For example, referring back to FIGS. 4 and 5, the base station 402 may determine the preconfigured frequency band 540.

At operation 904, the base station may perform an initial access procedure with a UE using the preconfigured frequency band. In aspects, the initial access procedure may include a RACH procedure. For example, referring back to FIG. 4, the base station 402 may perform the initial access procedure 410 with the UE 404. In the context of FIG. 6, the base station 602 may perform the initial access procedure 600 with the UE 604.

At operation 906, the base station may transmit, to the UE, one or more BRSs in one or more bands to be used for data communication (e.g., a BRS may be frequency-divisional multiplexed with a RACH message, such as a MSG2 or MSG4). For example, the base station 402 may transmit, to the UE 404, one or more BRSs in one or more bands to be used for data communication. In some aspects, referring back to FIGS. 4 and 5, the base station 402 may transmit, to the UE 404, a first set of BRSs 510, which may be frequency-division multiplexed with the RAR 506. In some aspects, the base station 402 may transmit, to the UE 404, a second set of BRSs 518, which may be frequency-division multiplexed with the MSG4 516. In the context of FIG. 7, the base station 702 may transmit, to the UE 704, one or more BRSs 712 that correspond to one or more beams 720, and each BRS 712 may be transmitted in a respective frequency band that may be used for data communication.

At operation 908, the base station may receive, from the UE, feedback based on the one or more BRSs. The feedback may include one or more measurements associated with beam quality in the one or more bands. For example, referring back to FIGS. 4 and 5, the UE 404 may transmit, to the base station, the feedback, which may be included with and/or multiplexed with the MSG3 512. In the context of FIG. 7, the base station 702 may receive, from the UE 704, the feedback 742.

The base station may refine (e.g., adjust) one or more beams based on the feedback. In some aspects, the base station may then transmit, to the UE, a second set of BRSs, which may be refined (e.g., adjusted) based on the feedback. For example, referring back to FIGS. 4 and 5, the base station 402 may transmit, to the UE 404, the second set of BRSs 518, which may be frequency-division multiplexed with the MSG4 516.

At operation 910, the base station may perform, after the initial access procedure, data communication with the UE using a second frequency band of the available system bandwidth. For example, referring back to FIG. 4, the base station 402 may perform, after the initial access procedure 410, data communication 412 with the UE 404.

At operation 912, the base station may perform a non-initial access procedure using a different frequency band than the preconfigured frequency band. For example, referring back to FIGS. 4 and 5, the base station 402 may perform the non-initial access procedure 414 with the UE 404 using a different frequency band than the preconfigured frequency band 540.

Figure 10:
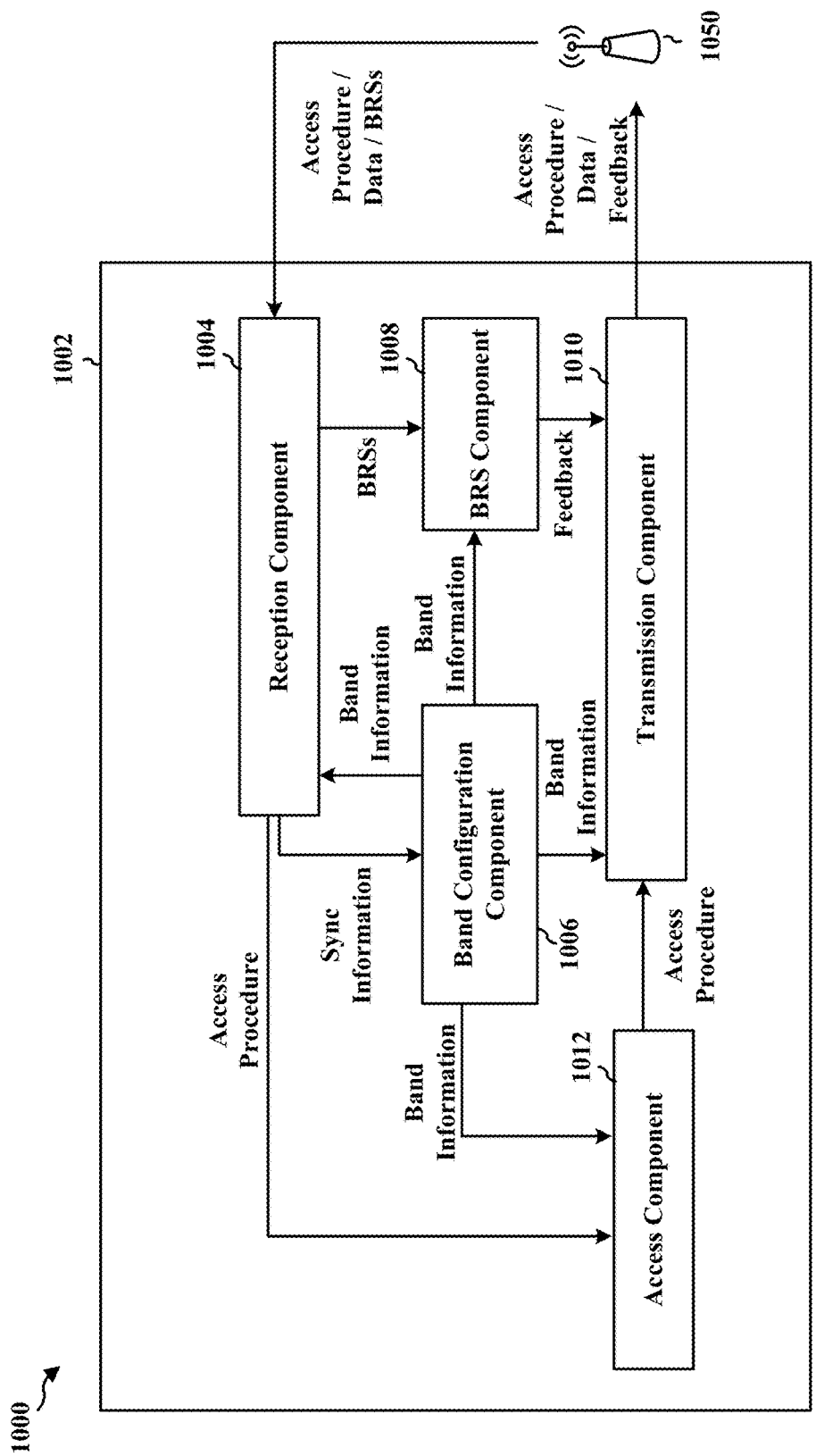
FIG. 10 is a conceptual data flow diagram illustrating the data flow between different means/components in an exemplary apparatus.

FIG. 10 is a conceptual data flow diagram 1000 illustrating the data flow between different means/components in an exemplary apparatus 1002. The apparatus may be a UE. The apparatus 1002 may include a transmission component 1010 configured to send signals (e.g., data) to a base station (e.g., the base station 1050). The apparatus 1002 may include a reception component 1004 configured to receive signals (e.g., data) from the base station (e.g., the base station 1050).

In an aspect, the apparatus 1002 may include a band configuration component 1006. The band configuration component 1006 may be configured to determine a preconfigured frequency band that is less than an available system bandwidth. The band configuration component 1006 may provide this preconfigured frequency band information to an access component 1012. The access component 1012 may be configured to perform an initial access procedure with the base station 1050 using the preconfigured frequency band. The initial access procedure may include a RACH procedure. In an aspect, the preconfigured frequency band is a preconfigured number of MHz in a center of an available system bandwidth (e.g., inclusively between 20 MHz and 40 MHz).

The band configuration component 1006 may determine at least a second frequency band of an available system bandwidth that is wider than and encompassing the preconfigured frequency band, at a different location than the preconfigured frequency band, and/or one of multiple frequency bands used for data communication. The band configuration component 1006 may provide an indication of the second frequency band to the transmission component 1010 and/or the reception component 1004. The transmission component 1010 and/or reception component 1004 may perform data communication with the base station 1050 using the second frequency band.

In an aspect, the apparatus 1002 may further include a BRS component 1008. The BRS component 1008 may be configured to receive, from the base station 1050, one or more BRSs in one or more bands that are to be used for data communication. In an aspect, the one or more bands in which the BRSs are received are different from the preconfigured frequency band used for the initial access procedure. In an aspect, the BRS component 1008 may measure a respective signal quality corresponding to one or more received BRSs. The BRS component 1008 may cause the transmission component 1010 to transmit, to the base station 1050, feedback including one or more measurements associated with beam quality in the one or more bands. In an aspect, a first set of the one or more BRSs is frequency-division multiplexed with one or more symbols received from the base station 1050 during the initial access procedure. For example, the first set of BRSs may be frequency-division multiplexed with one or more symbol of at least one of a MSG2 or a MSG4. In an aspect, one or more resources in which the one or more BRSs are to be received is indicated in one or more of a control signal of a MSG2, a control signal of a MSG4, a payload of a MSG2, a payload of a MSG4, an L1 signal, or any combination thereof. In an aspect, the one or more of the control signal of the MSG2, the control signal of the MSG4, the payload of the MSG2, the payload of the MSG4, the L1 signal, or any combination thereof further indicates antenna port information associated with the one or more BRSs.

In an aspect, the band configuration component 1006 may determine third band configuration information of a third frequency band that is wider than and encompassing the preconfigured frequency band, at a different location than the preconfigured frequency band, or one of multiple frequency bands. The band configuration component 1006 may provide the third band configuration information to the access component 1012.

The access component 1012 may perform a non-initial access procedure using a different configuration than the initial access procedure. The different configuration may include (e.g., be based on) the third band configuration information. The different configuration may include a using a RACH preamble sequence from a different set of preamble sequences used for the initial access procedure.

The apparatus may include additional components that perform each of the blocks of the algorithm in the aforementioned flowchart of FIG. 8. As such, each block in the aforementioned flowchart of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
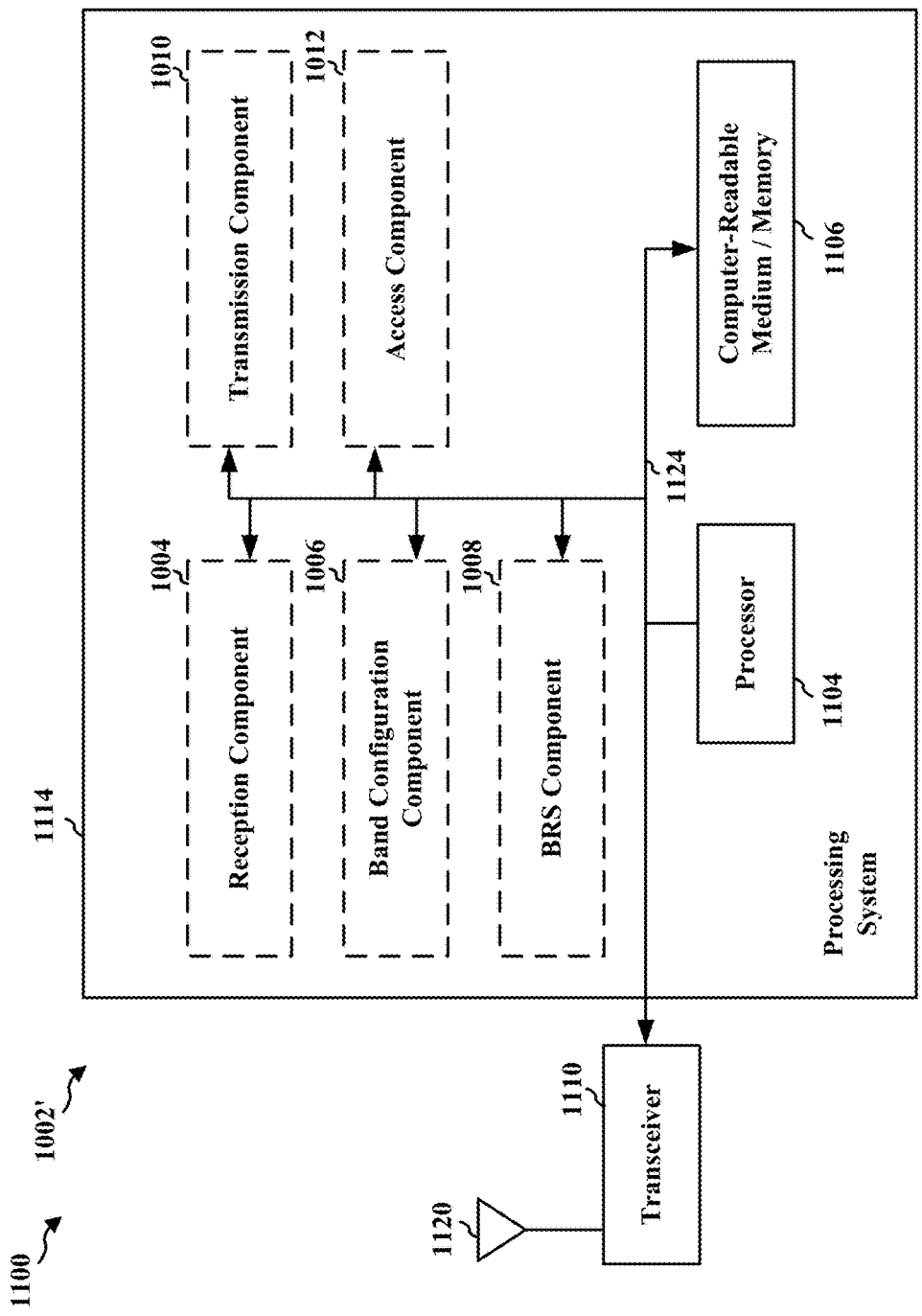
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, 1012, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1010, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010, 1012. The components may be software components running in the processor 1104, resident/stored in the computer readable medium/memory 1106, one or more hardware components coupled to the processor 1104, or some combination thereof. The processing system 1114 may be a component of the UE 350 and may include the memory 360 and/or at least one of the TX processor 368, the RX processor 356, and the controller/processor 359.

In one configuration, the apparatus 1002/1002' for wireless communication includes means for determining a preconfigured frequency band that is less than an available system bandwidth. The apparatus 1002/1002' may further include means for performing an initial access procedure with a base station using the preconfigured frequency band, and the initial access procedure may include a RACH procedure. In an aspect, the preconfigured frequency band is a preconfigured number of MHz in a center of the available system bandwidth. In an aspect, the preconfigured number of MHz is inclusively between 20 MHz and 40 MHz.

In an aspect, the apparatus 1002/1002' may further include means for performing data communication with the base station using a second frequency band of the available system bandwidth that is one of a frequency band wider than and encompassing the preconfigured frequency band, at a different location than the preconfigured frequency band, or one of multiple frequency bands used for the data communication.

In an aspect, the apparatus 1002/1002' may further include means for receiving, from the base station, one or more BRSs in one or more bands to be used for the data communication. In an aspect, the one or more bands in which the BRS are received are different from the preconfigured frequency band used for the initial access procedure.

In an aspect, the apparatus 1002/1002' may further include means for transmitting, to the base station, feedback based on the one or more BRSs, the feedback including one or more measurements associated with beam quality in the one or more bands. In an aspect, a first set of the one or more BRSs is frequency-division multiplexed with one or more symbols received from the base station during the initial access procedure. In an aspect, the first set of BRSs are frequency-division multiplexed with one or more symbols of at least one of a MSG2 or a MSG4. In an aspect, one or more resources in which the one or more BRSs are to be received is indicated in one or more of a control signal of a MSG2, a control signal of a MSG4, a payload of the MSG2, a payload of the MSG4, an L1 signal, or any combination thereof. In an aspect, the one or more of the control signal of the MSG2, the control signal of the MSG4, the payload of the MSG2, the payload of the MSG4, an L1 signal, or any combination thereof further indicates antenna port information associated with the one or more BRSs.

The apparatus 1002/1002' may further include means for performing a non-initial access procedure using a different configuration than the initial access procedure. In an aspect, the different configuration includes a third frequency band that is one of a frequency band wider than and encompassing the preconfigured frequency band, at a different location than the preconfigured frequency band, or one of multiple frequency bands. In an aspect, the different configuration includes using a RACH preamble sequence from a different set of preamble sequences used for the initial access procedure.

The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 12:
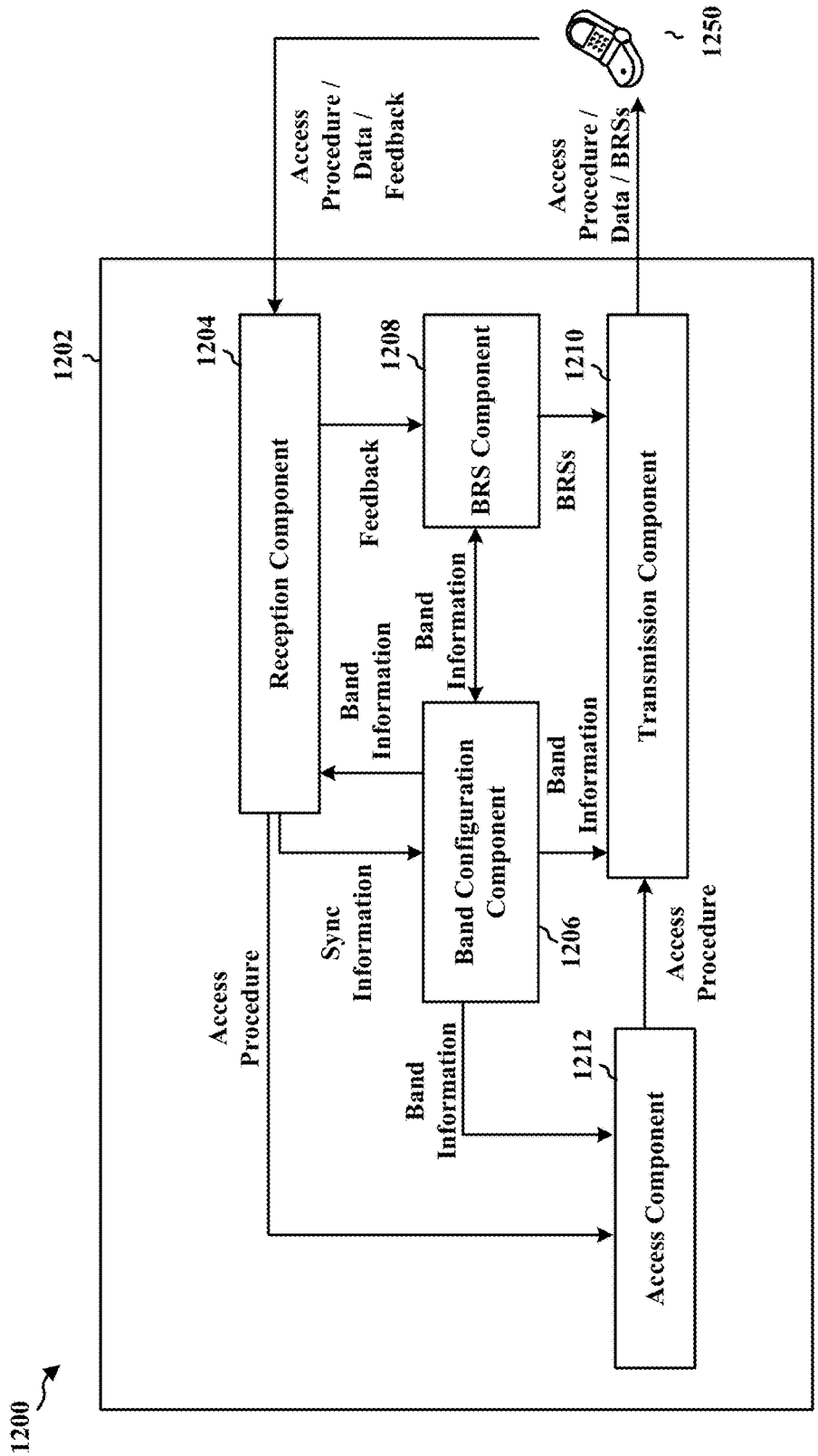
FIG. 12 is a conceptual data flow diagram illustrating the data flow between different means/components in an exemplary apparatus.

FIG. 12 is a conceptual data flow diagram 1200 illustrating the data flow between different means/components in an exemplary apparatus 1202. The apparatus may be a base station. The apparatus 1202 may include a transmission component 1210 configured to send signals (e.g., data) to a UE (e.g., the UE 1250). The apparatus 1202 may include a reception component 1204 configured to receive signals (e.g., data) from the base station (e.g., the UE 1250).

In an aspect, the apparatus 1202 may include a band configuration component 1206. The band configuration component 1206 may be configured to determine a preconfigured frequency band that is less than an available system bandwidth. The band configuration component 1206 may provide this preconfigured frequency band information to an access component 1212. The access component 1212 may be configured to perform an initial access procedure with the UE 1250 using the preconfigured frequency band. The initial access procedure may include a RACH procedure. In an aspect, the preconfigured frequency band is a preconfigured number of MHz in a center of an available system bandwidth (e.g., inclusively between 20 MHz and 40 MHz).

The band configuration component 1206 may determine at least a second frequency band of an available system bandwidth that is wider than and encompassing the preconfigured frequency band, at a different location than the preconfigured frequency band, and/or one of multiple frequency bands used for data communication. The band configuration component 1206 may provide an indication of the second frequency band to the transmission component 1210 and/or the reception component 1204. The transmission component 1210 and/or reception component 1204 may perform data communication with the UE 1250 using the second frequency band.

In an aspect, the apparatus 1202 may further include a BRS component 1208. The BRS component 1208 may be configured to transmit, to the UE 1250, one or more BRSs in one or more bands that are to be used for data communication. In an aspect, the one or more bands in which the BRSs are transmitted are different from the preconfigured frequency band used for the initial access procedure. In an aspect, the BRS component 1208 may receive, from the UE 1250, feedback indicating signal quality associated with one or more bands in which the BRSs are transmitted. The BRS component 1208 may provide the feedback to the band configuration component 1206 in order to configure one or more bands for communication (e.g., data communication, non-initial access, etc.) with the UE 1250. In an aspect, a first set of the one or more BRSs is frequency-division multiplexed with one or more symbols transmitted to the UE 1250 during the initial access procedure. For example, the first set of BRSs may be frequency-division multiplexed with one or more symbol of at least one of a MSG2 or a MSG4. In an aspect, one or more resources in which the one or more BRSs are to be transmitted is indicated in one or more of a control signal of a MSG2, a control signal of a MSG4, a payload of a MSG2, a payload of a MSG4, an L1 signal, or any combination thereof. In an aspect, the one or more of the control signal of the MSG2, the control signal of the MSG4, the payload of the MSG2, the payload of the MSG4, the L1 signal, or any combination thereof further indicates antenna port information associated with the one or more BRSs.

In an aspect, the band configuration component 1206 may determine third band configuration information that is one of a third frequency band that is wider than and encompassing the preconfigured frequency band, at a different location than the preconfigured frequency band, or one of multiple frequency bands. The band configuration component 1206 may provide the third band configuration information to the access component 1212.

The access component 1212 may perform a non-initial access procedure using a different configuration than the initial access procedure. The different configuration may include (e.g., be based on) the third band configuration information.

The apparatus may include additional components that perform each of the blocks of the algorithm in the aforementioned flowchart of FIG. 9. As such, each block in the aforementioned flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
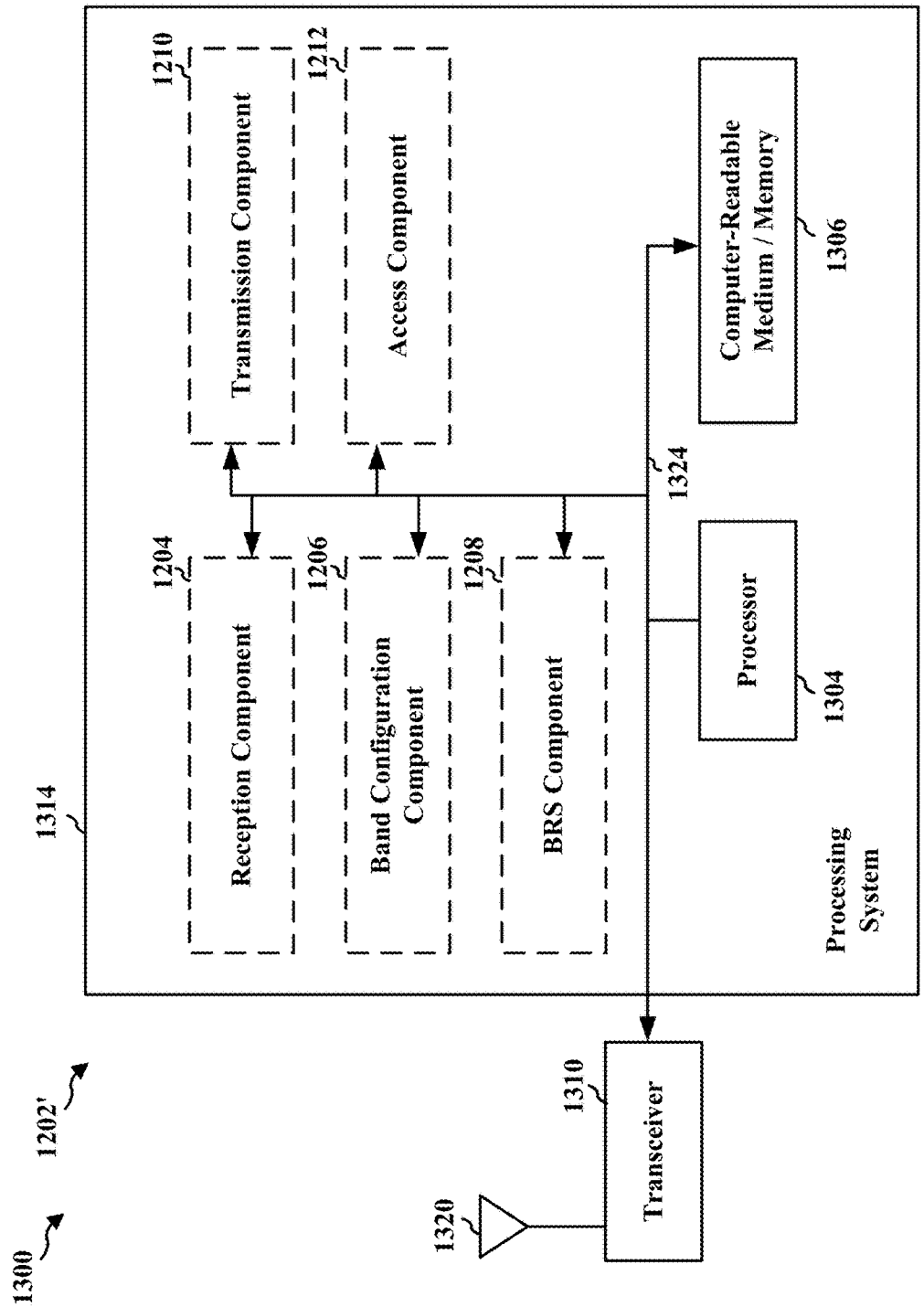
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1204, 1206, 1208, 1210, 1212 and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1204. In addition, the transceiver 1310 receives information from the processing system 1314, specifically the transmission component 1210, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system 1314 further includes at least one of the components 1204, 1206, 1208, 1210, 1212. The components may be software components running in the processor 1304, resident/stored in the computer readable medium/memory 1306, one or more hardware components coupled to the processor 1304, or some combination thereof. The processing system 1314 may be a component of the base station 310 and may include the memory 376 and/or at least one of the TX processor 316, the RX processor 370, and the controller/processor 375.

In one configuration, the apparatus 1202/1202' for wireless communication includes means for determining a preconfigured frequency band that is less than an available system bandwidth. The apparatus 1202/1202' may further include means for performing an initial access procedure with a UE using the preconfigured frequency band, and the initial access procedure may include a RACH procedure. In an aspect, the preconfigured frequency band is a preconfigured number of MHz in a center of the available system bandwidth. In an aspect, the preconfigured number of MHz is inclusively between 20 MHz and 40 MHz.

In an aspect, the apparatus 1202/1202' further includes means for performing data communication with the UE using a second frequency band of the available system bandwidth that is one of a frequency band wider than and encompassing the preconfigured frequency band, at a different location than the preconfigured frequency band, or one of multiple frequency bands used for the data communication.

In an aspect, the apparatus 1202/1202' further includes means for transmitting, to the UE, one or more BRSs in one or more bands to be used for the data communication. In an aspect, one or more bands for transmitting the BRS are different from a preconfigured frequency bands used for the initial access procedure.

In an aspect, the means for performing the initial access procedure is further configured to receive, from the UE, feedback based on the one or more BRSs, the feedback including one or more measurements associated with beam quality in the one or more bands. In an aspect, a first set of BRSs of the one or more BRSs is frequency-division multiplexed with one or more symbols transmitted by the base station during the initial access procedure. In an aspect, the first set of BRSs is frequency-division multiplexed with one or more symbols of the MSG2 and/or MSG4. In an aspect, a frequency band used for transmission of the first set of BRSs is different from the preconfigured band used for the initial access procedure. In an aspect, one or more resources in which the one or more BRSs are to be transmitted is indicated to the UE in one or more of a control signal of a MSG2, a control signal of a MSG4, a payload of the MSG2, a payload of the MSG4, an L1 signal, or any combination thereof. In an aspect, the one or more of the control signal of the MSG2, the control signal of a MSG4, the payload of the MSG2, the payload of the MSG4, an L1 signal, or the any combination thereof further indicates antenna port information associated with the one or more BRSs.

In an aspect, the apparatus 1202/1202' further includes means for performing a non-initial access procedure with the UE using a different configuration than the initial access procedure. In an aspect, the different configuration includes a third frequency band that is one of a frequency band wider than and encompassing the preconfigured frequency band, at a different location than the preconfigured frequency band, or one of multiple frequency bands.

The aforementioned means may be one or more of the aforementioned components of the apparatus 1202 and/or the processing system 1314 of the apparatus 1202' configured to perform the functions recited by the aforementioned means. As described supra, the processing system 1314 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication by a user equipment (UE), the method comprising:
    transmitting, to a base station, a random access channel preamble over a first bandwidth of a system bandwidth that is less than the system bandwidth;
    receiving, from the base station after transmitting the random access channel preamble, a random access channel response over the first bandwidth;
    receiving, from the base station after transmitting the random access channel preamble, one or more reference signals over one or more portions of a second bandwidth of the system bandwidth, the second bandwidth being wider than the first bandwidth, the one or more portions of the second bandwidth being different than the first bandwidth, the one or more reference signals being usable for determining a beam to be used for data communication over the second bandwidth; and
    receiving, from the base station, a physical downlink shared channel (PDSCH) over the second bandwidth via the beam based on the one or more reference signals.

2. The method of claim 1, further comprising:
    performing beam quality measurements of the one or more reference signals; and
    transmitting, to the base station, feedback based on the beam quality measurements of the one or more reference signals and indicating a beam quality in the one or more portions of the second bandwidth.

3. The method of claim 1, wherein the second bandwidth is wider than the first bandwidth and encompassing the first bandwidth.

4. The method of claim 1, wherein the UE transmits the random access channel preamble in an initial access procedure, the method further comprising:
    performing a non-initial access procedure using a different configuration than a first configuration of the initial access procedure.

5. The method of claim 4, wherein the different configuration includes using a RACH preamble sequence from a different set of preamble sequences than a first set of preamble sequences used for the initial access procedure.

6. The method of claim 1, wherein the first bandwidth is a preconfigured number of megahertz (MHz) in a center of the system bandwidth.

7. The method of claim 6, wherein the preconfigured number of MHz is between 20 MHz and 40 MHz.

8. The method of claim 1, wherein a first set of the one or more reference signals is frequency-division multiplexed with one or more symbols received from the base station during an initial access procedure.

9. The method of claim 8, wherein the first set of the one or more reference signals is frequency-division multiplexed with the one or more symbols in at least one of a second message (MSG2) or a fourth message (MSG4).

10. The method of claim 1, further comprising: receiving an indication of a resource for the one or more reference signals in one or more of a control signal of a MSG2, a control signal of a MSG4, a payload of the MSG2, a payload of the MSG4, a first layer (L1) signal, or any combination thereof.

11. The method of claim 10, wherein the one or more of the control signal of the MSG2, the control signal of the MSG4, the payload of the MSG2, the payload of the MSG4, the L1 signal, or any combination thereof further indicates antenna port information associated with the one or more reference signals.

12. An apparatus for wireless communication at a user equipment (UE), comprising:
    a memory; and
    at least one processor coupled to the memory and configured to:
        transmit, to abase station, a random access channel preamble over a first bandwidth of a system bandwidth that is less than the system bandwidth;
        receive, from the base station after transmitting the random access channel preamble, a random access channel response over the first bandwidth;
        receive, from the base station after transmitting the random access channel preamble, one or more reference signals over one or more portions of a second bandwidth of the system bandwidth, the second bandwidth being wider than the first bandwidth, the one or more portions of the second bandwidth being different than the first bandwidth, the one or more reference signals being usable for determining a beam to be used for data communication over the second bandwidth; and
        receive, from the base station, a physical downlink shared channel (PDSCH) over the second bandwidth via the beam based on the one or more reference signals.

13. The apparatus of claim 12, wherein the at least one processor is further configured to:
    perform beam quality measurements of the one or more reference signals; and
    transmit, to the base station, feedback based on the beam quality measurements of the one or more reference signals and indicating a beam quality in the one or more portions of the second bandwidth.

14. The apparatus of claim 12, wherein the second bandwidth is wider than the first bandwidth and encompassing the first bandwidth.

15. The apparatus of claim 12, wherein the apparatus is configured to transmit the random access channel preamble in an initial access procedure, and wherein the at least one processor is further configured to:
    perform a non-initial access procedure using a different configuration than a first configuration of the initial access procedure.

16. A method of wireless communication by a base station, the method comprising :
    receiving, from a user equipment (UE), a random access channel preamble over a first bandwidth of a system bandwidth that is less than the system bandwidth;
    transmitting, to the UE after receiving the random access channel preamble, a random access channel response over the first bandwidth;

transmitting, to the UE after receiving the random access channel preamble, one or more reference signals over one or more portions of a second bandwidth of the system bandwidth, the second bandwidth being wider than the first bandwidth, the one or more portions of the second bandwidth being different than the first bandwidth, the one or more reference signals being usable for determining a beam to be used for data communication over the second bandwidth; and transmitting, to the UE, a physical downlink shared channel (PDSCH) over the second bandwidth via the beam based on the one or more reference signals.

17. The method of claim 16, wherein the base station receives the random access channel preamble in an initial access procedure, the method further comprising:

receiving, from the UE, feedback based on the one or more reference signals, the feedback based on beam quality measurements in the one or more portions of the second bandwidth.

18. The method of claim 16, wherein the second bandwidth is wider than the first bandwidth and encompassing the first bandwidth.

19. The method of claim 16, wherein the random access channel preamble is received in an initial access procedure, the method further comprising:

performing a non-initial access procedure with the UE using a different configuration than the initial access procedure.

20. The method of claim 19, wherein the different configuration includes one of a third bandwidth that is one of wider than and encompassing the first bandwidth, at a different location than the first bandwidth, or one of multiple frequency bands used for the data communication other than the first bandwidth, and wherein the non-initial access procedure is different than transmission of the PDSCH.

21. The method of claim 16, wherein the first bandwidth is a preconfigured number of megahertz (MHz) in a center of the system bandwidth.

22. The method of claim 21, wherein the preconfigured number of MHz is between 20 MHz and 40 MHz.

23. The method of claim 16, wherein a first set of reference signals of the one or more reference signals is frequency-division multiplexed with one or more symbols transmitted by the base station during an initial access procedure.

24. The method of claim 23, wherein the first set of reference signals is frequency-division multiplexed with the one or more symbols in at least one of a second message (MSG2) or a fourth message (MSG4).

25. The method of claim 23, where a frequency band used for transmission of the first set of reference signals is different from the first bandwidth used for the initial access procedure.

26. The method of claim 16, further comprising:

indicating a resource in for the one or more reference signals in one or more of a control signal of a second message (MSG2), a control signal of a fourth message (MSG4), a payload of the MSG2, a payload of the MSG4, an L1 signal, or any combination thereof.

27. The method of claim 26, wherein the one or more of the control signal of the MSG2, the control signal of a MSG4, the payload of the MSG2, the payload of the MSG4, the L1 signal, or the any combination thereof further indicates antenna port information associated with the one or more reference signals.

28. An apparatus for wireless communication by a base station, comprising:

a memory; and at least one processor coupled to the memory and configured to:

receive, from a user equipment (UE), a random access channel preamble over a first bandwidth of a system bandwidth that is less than the system bandwidth;

transmit, to the UE after receiving the random access channel preamble, a random access channel response over the first bandwidth;

transmit, to the UE after receiving the random access channel preamble, one or more reference signals over one or more portions of a second bandwidth of the system bandwidth, the second bandwidth being wider than the first bandwidth, the one or more portions of the second bandwidth being different than the first bandwidth, the one or more reference signals being usable for determining a beam to be used for data communication over the second bandwidth; and transmit, to the UE, a physical downlink shared channel (PDSCH) over the second bandwidth via the beam based on the one or more reference signals.

29. The apparatus of claim 28, wherein the at least one processor is further configured to:

receive, from the UE, feedback based on the one or more reference signals, the feedback based on beam quality measurements in the one or more portions of the second bandwidth.

30. The apparatus of claim 28, wherein the second bandwidth is wider than the first bandwidth and encompassing the first bandwidth.

* * * * *